United States Patent
Walter et al.

(10) Patent No.: US 6,944,778 B2
(45) Date of Patent: Sep. 13, 2005

(54) METHOD FOR TESTING AN INTEGRATED CIRCUIT INCLUDING HARDWARE AND/OR SOFTWARE PARTS HAVING A CONFIDENTIAL NATURE

(75) Inventors: Fabrice Walter, Marin (CH); Hugues Blangy, Neuchâtel (CH)

(73) Assignee: EM Microelectronic—Marin SA (CH)

( * ) Notice: Subject to any disclaimer, the term of this patent is extended or adjusted under 35 U.S.C. 154(b) by 803 days.

(21) Appl. No.: 09/764,683

(22) Filed: Jan. 18, 2001

(65) Prior Publication Data

US 2001/0010080 A1 Jul. 26, 2001

(30) Foreign Application Priority Data

Jan. 26, 2000 (EP) ............................................ 00101502

(51) Int. Cl.[7] .......................... G06F 11/30; G06F 12/14; H04L 9/00; H04L 9/32
(52) U.S. Cl. ........................ 713/202; 713/168; 713/193; 713/183; 713/184; 380/278; 380/281
(58) Field of Search ................................ 713/202, 168, 713/193, 183, 184, 200, 201, 172; 380/278, 281, 28, 29

(56) References Cited

U.S. PATENT DOCUMENTS

| | | | | |
|---|---|---|---|---|
| 4,802,217 A | * | 1/1989 | Michener | ...................... 380/29 |
| 5,526,311 A | | 6/1996 | Kreifels et al. | |
| 5,530,749 A | | 6/1996 | Easter et al. | |
| 5,629,513 A | * | 5/1997 | Geronimi et al. | ............ 235/492 |
| 5,875,248 A | * | 2/1999 | Lewis | ......................... 713/168 |
| 6,067,621 A | * | 5/2000 | Yu et al. | ...................... 713/172 |
| 6,112,187 A | * | 8/2000 | Fukawa | ........................ 705/18 |
| 6,577,229 B1 | * | 6/2003 | Bonneau et al. | .......... 340/10.41 |

FOREIGN PATENT DOCUMENTS

DE       98/08846       7/1998

* cited by examiner

Primary Examiner—Kim Vu
Assistant Examiner—Beemnet W Dada
(74) Attorney, Agent, or Firm—Richard K Robinson

(57) ABSTRACT

This method uses a tester (T) capable of being connected to an integrated circuit (CI) to be tested.

A random number (RNG-C) is generated and ciphered using a key (k) by a cipher algorithm to obtain a password ($G_k$(RNG)-C). The random number (RNG-C) is sent to the tester (T) in which the received random number (RNG-C) is ciphered using the same key (k) by a same cipher algorithm to generate therein a second password ($G_k$(RNG)-T). This latter is sent to the integrated circuit (CI) to be compared to the first password ($G_k$(RNG)-C). The test of the confidential parts (1) of the circuit is only authorised if the two passwords exhibit the required match.

12 Claims, 1 Drawing Sheet

METHOD FOR TESTING AN INTEGRATED CIRCUIT INCLUDING HARDWARE AND/OR SOFTWARE PARTS HAVING A CONFIDENTIAL NATURE

CROSS-REFERENCE TO RELATED APPLICATIONS

This application claims priority from European Patent Application No 00101502.3 filed Jan. 26, 2000, the entire disclosure of which is incorporated herein by reference.

FIELD OF THE INVENTION

The present invention relates to integrated circuits containing hardware and/or software parts having a confidential nature.

BACKGROUND OF THE INVENTION

The manufacture of any integrated circuit usually involves a test procedure intended to check the proper working of its hardware circuits and the software which are often stored therein. When such hardware and/or software parts are confidential, this test procedure should not allow them to be divulged to unauthorised persons.

U.S. Pat. No. 5,039,850 discloses an integrated circuit of this type which itself contains its test sub-programme. It includes an EEPROM memory intended to contain secret data including for example an identification code for the integrated circuit and confidential data.

When a test procedure for this integrated circuit has to be implemented, it is first checked whether the secret code has already been stored. If this is not the case, the test sub-programme is executed on all the non confidential elements of the circuit. If, conversely, the secret code has already been stored, the tester has to send the same code and it there is a match between the latter and the stored code, the EEPROM memory is initialised and the confidential data become available to be exploited by the integrated circuit. This means that the data remain confidential as regards the tester, since a test can only be effected if the secret code has not yet been stored. However, this also means that no test can be applied to these confidential data.

It will thus be understood that the process known from this prior art is only directed towards the case in which the test is always effected before the confidential data are entered into the integrated circuit.

SUMMARY OF THE INVENTION

The object of the present invention is to provide a test method for integrated circuits in which a test can be executed on the confidential parts contained in the circuit without the contents of these parts becoming accessible to an unauthorised person.

The invention thus concerns a test method for an integrated circuit containing elements having a confidential nature using a tester, having the features defined in claim 1.

As a result of these features, the tester can have access to the elements of a confidential nature to test them, but it only manages to generate a password having a predetermined relation with the password generated in the integrated circuit. Access to the protected elements is thus perfectly preserved.

The invention also concerns an integrated circuit exhibiting the features of claim 7.

The invention also concerns a tester exhibiting the features of claim 11.

Other peculiarities of the invention result from the dependent claims.

BRIEF DESCRIPTION OF THE DRAWINGS

Other features and advantages of the invention will appear during the following description, given solely by way of example and made with reference to the annexed drawings, in which.

DETAILED DESCRIPTION OF THE INVENTION

Figure 1:
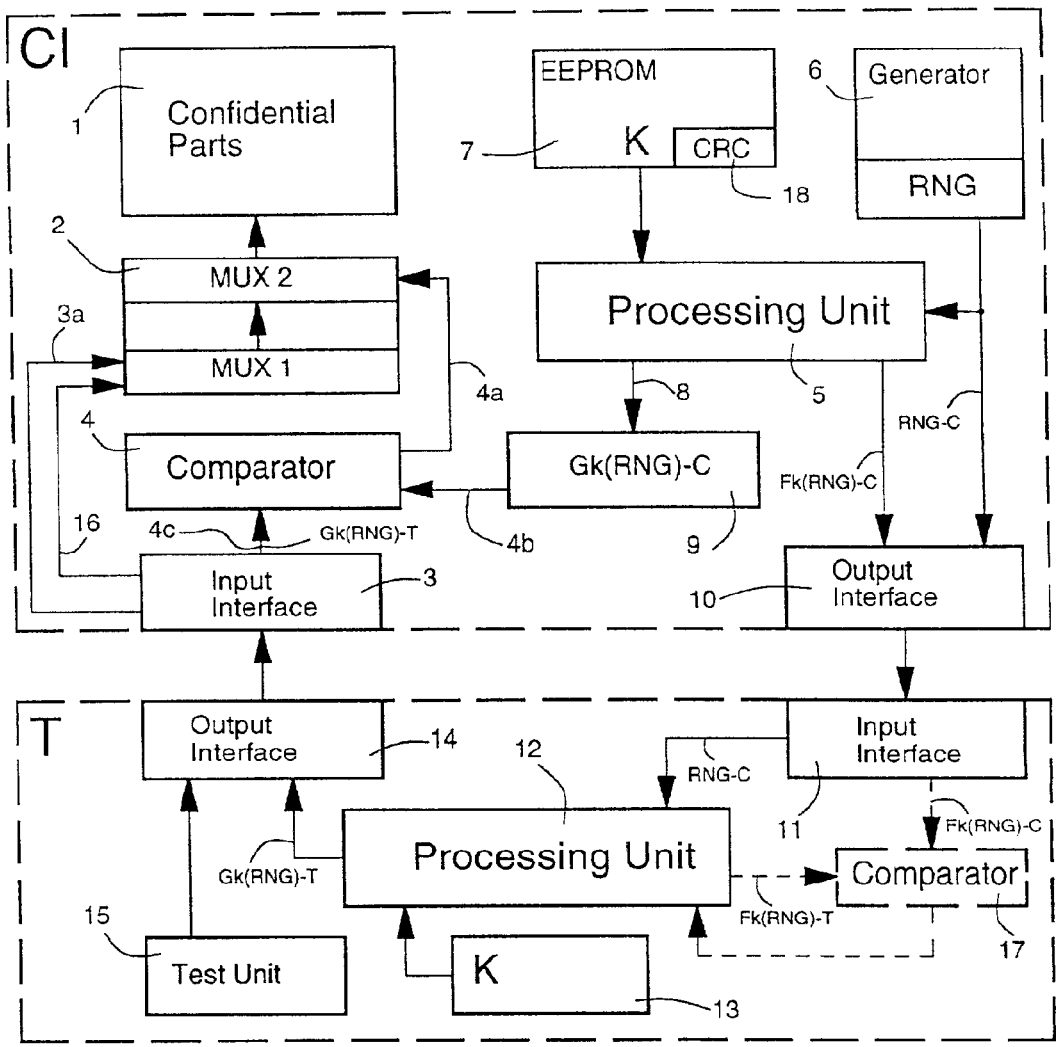
FIG. 1 is a simplified diagram of an integrated circuit CI having parts of a confidential nature, connected to a tester while the method of the invention is implemented.

FIG. 1 shows an integrated circuit CI to be tested as well as a tester T. When tester T is connected to circuit CI or to another integrated circuit of the same structure, the assembly allows the preferred embodiment of the invention to be implemented.

Integrated circuit CI includes a section 1 including hardware and/or software parts having a confidential nature and to which access is restricted. These may be for example ROM and/or RAM memories containing confidential data such as algorithms, programmes, data, or test procedures for this confidential section. An EEPROM memory in which calibrating parameters for reference electronic modules associated with corresponding signatures, cipher keys, test signatures, etc. may also form part of this confidential part. It may also be hardware parts of the circuit, like reference modules such as an oscillator or a voltage regulator for example. Those skilled in the art will understand that the confidential data or the hardware parts to be protected may be of any nature, the invention solely concerning an authentication process allowing confidential section 1 of circuit CI to be tested.

The confidential section or confidential parts 1 are accessible for testing via a barrier 2 providing conditional access to parts 1. This barrier 2 may be made in the form of two multiplexers Mux 1 and Mux 2 connected between an input interface 3 of circuit CI and confidential section 1. Multiplexer Mux 2 may be controlled so as to authorise the passage of test data from interface 3 via a connection 3a only if a control signal is supplied by a comparator 4 over a connection 4a.

Connection 4a is connected to the output of comparator 4 whose inputs are respectively connected to connections 4b and 4c, the latter being connected to interface 3.

Circuit CI also includes a cipher unit 5 in which a first password $G_k(RNG)$-C can be calculated using a cipher algorithm. The latter works with a random number RNG-C generated in a random number generator 6 and with a cipher key k stored in a section 7 of an EEPROM memory. Generator 6 and memory section 7 are thus connected to cipher unit 5.

The latter is also connected via a password output 8 to a password register 9 to receive the first password $G_k(RNG)$-C which is also connected to connection 4b towards comparator 4.

The cipher algorithm implemented in cipher unit 5 may be a public algorithm which is known. For example, it may be a standard algorithm known under the name DES by those skilled in the art.

Random number generator 6 is also connected to an output interface 10 of circuit CI.

Tester T includes an input interface 11 which is connected, during a test, to output interface 10 of an integrated circuit CI to be tested. This input Interface 11 can thus receive from the latter the random number RNG-C which, at the moment of connection for performing a test, is present in random number generator 6 of circuit CI.

Tester T also includes a cipher unit 12 connected to input interface 11 to receive therefrom the random number RNG-C generated in integrated circuit CI. This cipher unit 12 is arranged to effect ciphering using an identical algorithm to that with which cipher unit 5 of circuit CI works. Ciphering in tester T is effected using a cipher key k arranged in a section 13 of an EEPROM memory of tester T. This key k is the same as that contained in EEPROM memory section 7 of integrated circuit CI.

Thus, tester T is capable of calculating a second password $G_k(RNG)$-T on the basis of random number RNG-C.

Tester T also includes an output interface 14 connected to the output of ciphering unit 12, so that the password which is calculated therein can be routed towards integrated circuit CI.

This output interface 14 is also connected to a test unit 15 capable of implementing the test functions to which circuit CI has to be subjected and the data from which is routed via interfaces 14 and 3 towards multiplexer Mux 2 of integrated circuit CI.

Interfaces 3, 10, 11 and 14 are, in a known manner, "status machines" which, using the respective inner clocks of circuit CI and tester T, control the data routing transmission and reception protocols between the two components CI and T.

Multiplexer Mux 1 connected in series upstream of multiplexer Mux 2 with respect to tester T, is connected to interface 3 to route the data necessary for authentication towards the parts of the circuit concerned such as EEPROM memory section 7 and cipher unit 5 (for simplification purposes the corresponding connections have not been shown).

This first multiplexer Mux 1 is controlled ("open") by a test mode signal relayed via a conductor 16 from tester T, while multiplexer Mux 2 is controlled by the output of comparator 4 (connection 4a).

The essential steps of the test procedure of integrated circuit CI occur in the following manner.

When tester T is connected to integrated circuit CI, the test procedure is initiated by sending the test mode signal passing over conductor 16. This causes the introduction in processing unit 5 of the random number RNG-C generated, at the instant concerned, by generator 6 and key k which is extracted from memory 7. The first password $G_k(RNG)$-C is then calculated using the DES cipher algorithm for example and this password is placed in register 9.

Random number RNG-C is also sent to tester T by being routed by interfaces 10 and 11 to be applied to processing unit 12 in which a calculation is also effected using the same cipher algorithm, from the cipher key k extracted from memory section 13 and from the random number RNG-C received. This ciphering processing will end with the generation of a second password $G_k(RNG)$-T. This latter is routed to integrated circuit CI via interfaces 14 and 3 then applied to comparator 4.

Comparator 4 is arranged to effect a bit by bit comparison of the two passwords $G_k(RNG)$-C and $G_k(RNG)$-T which are applied thereto.

If there is a match between the two passwords applied to comparator 4, this will mean that authentication of tester T has succeeded and that the latter is thus able to have access to confidential parts 1. Multiplexer Mux 2 is controlled by the signal relayed over connection 4a via which the path leading from tester T to confidential parts 1 of integrated circuit CI via connection 3a, is open. Tester T can then perform the required test operations via test unit 15 to check that confidential parts 1 of integrated circuit CI are operating properly and if this is the case, validate the circuit in question. In the absence of a match, access to confidential parts 1 will remain prohibited to tester T.

In order to increase access security, and according to a first variant of the invention illustrated in doted lines in FIG. 1, it is possible to authorise calculation of the second password $G_k(RNG)$-T by processing unit 12 of tester T only after verification of a previously calculated third password. For this purpose, before calculation of the first $G_k(RNG)$-C in processing unit 5 of integrated circuit CI, a third password $F_k(RNG)$-C is calculated, possibly over a different number of clock strokes to that over which the first password $G_k(RNG)$-C is calculated.

This third password $F_k(RNG)$-C is sent to tester T following random number RNG-C after initialisation of the authentication procedure, through interfaces 10 and 11. Processing unit 12 of tester T then also has to calculate a fourth password $F_k(RNG)$-T which is applied to a comparator 17 forming part of tester T, this comparator being connected on the one hand to interface 11 from which it receives the third password $F_k(RNG)$-C calculated in integrated circuit CI and on the other hand to processing unit 12 to receive therefrom the fourth password $F_k(RNG)$-T which is calculated therein.

It is only when comparator 17 observes a match between the third and fourth passwords $F_k(RNG)$-C and $F_k(RNG)$-T that it sends a signal to processing unit 12 authorising calculation of the second password $G_k(RNG)$-T. For this purpose, comparator 17 is connected via its output to this processing unit 12.

The functions $F_k(RNG)$-C and $F_k(RNG)$-T allow integrated circuit CI to be authenticated, while functions $G_k(RNG)$-C and $G_k(RNG)$-T allow the tester to be authenticated. This latter part constitutes the important part of the object of the invention, for the purpose of prohibiting an unauthorised tester from having access to the confidential parts of the integrated circuit.

Figure 2:
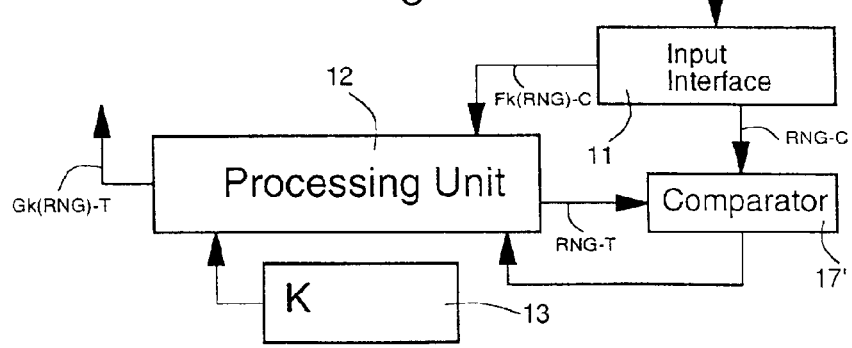
FIG. 2 shows a portion of the tester to illustrate a variant of the invention.

According to another variant of the invention which is similar to the variant which has just been described and which is shown in FIG. 2, the third password $F_k(RNG)$-C is also calculated in integrated circuit CI as previously described and routed to tester T via interfaces 10 and 11. In this case, this third password is applied to processing unit 12 which is then arranged to effect a calculation on this password using the reverse algorithm to that used for calculating the fourth password $F_k(RNG)$-T. The result of this calculation will be a random number RNG-T which is applied to a comparator 17'. The latter is thus connected by one of its inputs to processing unit 12, its other input being connected to interface 11 to receive RNG-C. The output of comparator 17' is connected to processing unit 12 to send it a signal authorising calculation of the second password $G_k(RNG)$-T only if comparator 17 observes a match between random numbers RNG-C and RNG-T applied to its inputs. This calculation authorisation signal then allows calculation of the second password $G_k(RNG)$-T in processing unit 12 to start.

Preferably, during manufacturing of integrated circuit CI, the bits of EEPROM memory section 7 intended to store cipher key k are all brought to a predetermined value (for example all the bits are exclusively formed of bits of level 0 or exclusively of bits of level 1). Introduction of the cipher key in this memory section 7 is effected in a phase prior to the tests during which a coherence check is effected via a code redundancy check unit 18 included in EEPROM memory section 7. Tester T effects this operation which, initially, ends with a failure because the initial values of the key storage bits and that of the key sent which as a rule is different. Upon observing that the key has not yet been registered, tester T introduces one into EEPROM memory section 7 after which the corresponding location of EEPROM memory section 7 is read/write blocked. The test procedure described hereinabove can then begin and proceed as described hereinabove.

It is to be noted that the passwords calculated in the integrated circuit and the tester and subjected to the respective comparisons do not necessarily have to be identical. They need only have a predetermined relationship with each other which will be checked during these comparisons. The term match should thus be understood in a broad sense.

What is claimed is:

1. A method for testing an integrated circuit containing hardware and/or software parts having a confidential nature, using a tester, wherein this method comprises the steps of:
   in said integrated circuit:
      generating a random number by a generator,
      ciphering this random number using a key stored in said integrated circuit via a ciphering algorithm to obtain a first password placed in a password register, and
      sending the random number to said tester,
   and, in said tester:
      ciphering in parallel said random number received using a key identical to that used in said integrated circuit via an identical ciphering algorithm to that implemented in said integrated circuit, to generate a second password, and
      sending said second password from the tester to said integrated circuit,
   then, in said integrated circuit,
      comparing said first and second passwords by comparing means,
      freeing a test path leading from said tester to said parts of a confidential nature by opening a barrier in the integrated circuit, only if the comparison establishes a match between said first and second passwords, and
      effecting the test of said elements of a confidential nature.

2. A method according to claim 1, wherein it also comprises the steps of
   in said integrated circuit:
      ciphering said random number using said key stored in the integrated circuit via said ciphering algorithm to obtain a third password;
      sending said third password to said tester; and
   in said tester:
      ciphering said random number received using said key stored in said tester via said ciphering algorithm to obtain a fourth password;
      comparing said third and fourth passwords; and
      authorizing the ciphering of said second password via said tester only if there is a match between said third and fourth passwords.

3. A method according to claim 1, wherein it also comprises the steps of:
   in said integrated circuit:
      ciphering said random number using said key stored in the integrated circuit via said ciphering algorithm to obtain a third password;
      sending said third password to said tester; and
   in said tester:
      performing the reverse ciphering of said third password received, using said key stored in said tester via said ciphering algorithm to find a calculated random number;
      comprising the random number received from said integrated circuit to said calculated random number, and
      authorizing the ciphering of said second password via said tester only if there is a match between said received and calculated random numbers.

4. A method according to claims 2 or 3, wherein the ciphering of said third and/or fourth passwords is made on the basis of a different number of clock strokes than that used for ciphering said first and second passwords.

5. A method according to claim 1, wherein it consists, as far as said matches are concerned, in checking that said passwords; respectively said received and calculated random numbers are equal.

6. A method according to claim 1, wherein it comprises the steps of, upon manufacturing said integrated circuit, storing a predetermined value of said cipher key, and during execution of said test procedure using said tester, sending to said integrated circuit, a cipher key value, checking whether said cipher key sent has the predetermined value stored in said integrated circuit, commanding said key sent to be stored in said integrated circuit in case an inequality is observed during said check and blocking in such case the storage in said circuit of any other cipher key.

7. An integrated circuit including hardware and/or software parts having a confidential nature and means for conditionally routing test data to said hardware and/or software parts, wherein it includes:
   a random number generator;
   means for storing a cipher key;
   processing means for calculating a first password from said key and a generated random number, using a cipher algorithm;
   means for routing a random number towards the exterior; and
   means for comparing said first calculated password placed in a password register with a second password received from the exterior, said second password being calculated in accordance with the random number generated by the generator, said comparison means being connected to said routing means for freeing a test path leading to said parts of a confidential nature by opening a barrier in the integrated circuit only if there is a match between said first and second passwords.

8. An integrated circuit according to claim 7, wherein said password register is placed before the comparison means to provide said first stored password, for comparison means, at the moment of comparison with the second password.

9. An integrated circuit according to claim 7, wherein the means for storing the cipher key are an EEPROM memory which also includes a redundancy unit check.

10. An integrated circuit according to claim 7, wherein the processing means are provided for calculating a third password using the cipher key, from the random number generated and the circuit cipher algorithm, said third password being intended to be sent towards the exterior with the random number to a specific tester.

11. A method according to claim 1, wherein, when tester is connected to integrated circuit, the test procedure is initiated by sending the test mode signal form the tester, which causes the introduction in a processing unit of the random number generated, at the instant concerned, by a random number generator, and a cipher key from storing means, and the transmission of said random number to said tester.

12. An integrated circuit according to claim 7, wherein the barrier for accessing to the confidential parts of the integrated circuit includes two multiplexers connected between routing means and a confidential section, one of the multiplexers being controlled to authorize the passage of test data from routing means only if a control signal is supplied by a comparator of comparing means in function of a match between said first and second passwords.

* * * * *